United States Patent [19]
Marquis

[11] 3,953,641
[45] Apr. 27, 1976

[54] PLY OF PARALLEL FILAMENTS

[75] Inventor: Paul Marquis, Tassin-La-Demi-Lune, France

[73] Assignee: Societe Civile D'Etudes et de Recherches pour L'Obtention de Fibres Minerales (S.E.R.O.F.I.M.), Paris, France

[22] Filed: Apr. 19, 1973

[21] Appl. No.: 352,624

[30] Foreign Application Priority Data
Apr. 19, 1972 France............................. 72.14536

[52] U.S. Cl................................ 428/195; 156/181; 428/295; 428/303; 428/337; 428/339; 428/340; 428/367; 428/902
[51] Int. Cl.². ..................... B32B 7/14; D02G 3/00
[58] Field of Search .......... 161/165, 150, 182, 197, 161/206, 208, 92, 93, 155, 156, 157, 66, 170, 58, 142, 143, 144; 428/292, 294, 295, 297, 303, 408, 195, 197; 156/181

[56] References Cited
UNITED STATES PATENTS

| | | | |
|---|---|---|---|
| 2,943,011 | 6/1960 | Rayner............................ | 161/197 X |
| 3,622,429 | 11/1971 | Kippan............................ | 161/146 X |
| 3,669,158 | 6/1972 | Phillips............................ | 161/93 X |
| 3,681,185 | 8/1972 | Gelb................................ | 161/60 X |
| 3,695,326 | 10/1972 | Bryant............................ | 161/150 X |
| 3,726,751 | 4/1973 | Casadevall..................... | 161/58 |
| 3,819,461 | 6/1974 | Saffadi............................ | 161/182 X |

FOREIGN PATENTS OR APPLICATIONS
1,141,539   1/1969   United Kingdom

Primary Examiner—George F. Lesmes
Assistant Examiner—Alan T. McDOnald
Attorney, Agent, or Firm—Stevens, Davis, Miller & Mosher

[57] ABSTRACT

This invention provides a light ply of parallel continuous high-performance filaments, and a method of obtaining same.

The ply is characterized by a weight per unit surface of at most 450 g/m2, a thickness of at most 1 mm, a content of at least 85% by weight of high-performance fibers, a close structure, and furthermore comprising on at least one of its two faces fused synthetic yarns arranged transversely with respect to the direction of the high-performance filaments which hold the latter in place without passing through the ply from one face to the other.

The plies thus obtained are used for the manufacture of high-performance composite materials.

11 Claims, 3 Drawing Figures

PLY OF PARALLEL FILAMENTS

The present invention relates to a light weight ply of parallel continous filaments which can be used in particular for the production of laminated composite materials.

From British Pat. No. 1,259,783 and Belgian Pat. No. 759,753 it is known to produce sheets of carbon by impregnating continuous carbon filaments with a resin and heat treatment. However, this process requires a large amount of resin and thus decreases the proportion of carbon in the ply.

It is also known to weave fabrics composed of wrapped or unwrapped carbon fiber fillings and a warp of natural, artificial or synthetic yarn. In order to obtain such fabrics having a high proportion of carbon, it is necessary to use very low density warp yarns which leads to fabrics having no strength upon subsequent handling. Furthermore, very light plies can be obtained only with very slack structures, leading to laminated composite materials of poor performance. Consequently, plies of a weight of less than 450–500 g/m2 can not be obtained in practice without harming the other characteristics of the ply. Furthermore, the direction of the carbon filaments is necessarily perpendicular to the warp yarns.

From French Pat. No. 987,652, it is known to make a non-woven fabric composed of a mixture of adhesive and non-adhesive fibers, but in this case the non-adhesive fibers are not parallel but more or less interlaced with the adhesive fibers and the weight per unit of surface is high.

From British Pat. No. 777,734, it is known to make a non-woven fabric by adhesively binding filling yarns on an assembly of tire cords arranged side by side, but the product obtained has a high weight per unit of surface.

It has finally been proposed in Netherlands Application No. 69 09981 to prepare plies formed of at least two layers of glass fibers, at least one of which is composed of parallel filaments, by chain stitch or zigzag sewing of the layers by means of connecting yarns which pass through the said layers. Here again it is not possible to obtain a light ply and the passage through the ply by the connecting yarns leads to the formation of weak points in the laminated composite material resulting therefrom.

It is therefore an object of this invention to provide a ply of high-performance parallel filaments which is light in weight and devoid of the foregoing disadvantages.

Another object of the invention is to provide a substantially non-porous light weight ply of bound together continuous elongated contiguous filaments having a modulus of elasticity in tension of at least 2000 hectobars.

The present invention provides a ply of high-performance parallel continuous filaments having a weight per unit surface of at most 450 g/m2, a thickness of at most 1 mm, a content of at least 85% by weight high-performance filaments, a close structure bound together by fused synthetic yarns arranged transversely with respect to the direction of the high-performance filaments on at least one face of the ply without passing through the ply from one face to the other.

The invention also provides a process of preparing these plies which involves depositing an adhesive material very uniformly on a roving composed of numerous continuous filaments of high performance, thereupon adjusting the weight of the roving per unit of surface slightly less than that desired for the final ply while maintaining the elementary filaments parallel and adjoining each other, disposing several rovings adjusted in this manner side by side to form a ply while also maintaining them parallel and adjoining, depositing thermofusible yarns on at least one of the faces of said ply transversely with respect to the direction of the high-performance filaments, and treating the resultant ply at sufficient temperature to fuse the thermofusible yarns and cause them to adhere to the said high-performance filaments.

The ply or web provided by the invention has a weight per unit surface of not more than 450 g/m2, and preferably less than 150 g/m2, but the latter may be even lower, for instance 60 g/m2 or less.

The thickness of the ply is at most equal to 1 mm; it is generally between 6/100 and 1 mm, and preferably between 8/100 mm and 0.15 mm.

The ply in accordance with the invention is composed of at least 85% of its weight, and preferably at least 90%, of high-performance fibers. By high-performance fibers is meant fibers having a modulus of elasticity in tension of at least 2,000 hectobars. These fibers may be fibers of carbon, graphite, glass, silicon carbide, boron or aromatic polyamides, etc. Depending on the performances which it is desired to obtain, one or the other of these fibers will be selected. Among the carbon or graphite fibers, one may select either those obtained from cellulose fibers or those obtained by carbonization or graphitization of fibers of acrylonitrile fibers, for instance those of a modulus of elasticity in tension of at least 12,000 hectobars, and preferably of the order of 18,000 to 45,000 hectobars.

The ply in accordance with the invention has very close structure, that is to say, the high-performance filaments are arranged one against the other substantially without any space between them.

Fused synthetic yarns are arranged transversely with respect to the direction of the high-performance yarns. The angle of crossing formed by the direction of the fused synthetic yarns and the direction of the high-performance filaments may vary within wide limits; it is preferably 90° ± 60°, although it may also, if desired, be larger or smaller. For certain applications it may be advantageous to select for this angle a value of 45° or of 135°, or even to use several successive layers of different angles of crossing.

These fused synthetic yarns should be located at preferably uniform intervals. These intervals may vary within wide limits, for instance from 2 cm to 5 or 10 cm, depending upon the strength desired for the final ply and the nature of the manipulations which it must undergo.

These yarns are arranged on at least one face, but preferably on both faces, to improve the life. In the latter case it is generally preferred to deposit each fused synthetic yarn of one face between two adjacent synthetic yarns of the other face.

The synthetic yarns are fused in such a manner that they do not pass through the ply in order not to move the high-performance filaments apart but only hold them in place.

These synthetic yarns must be thermofusible, that is to say, they must fuse at a given temperature without decomposing or evaporating. Preferably yarns which are compatible with the nature of the resin which will be used subsequently to manufacture the laminated composite material are selected. Mention may be made, for instance, of yarns of copolyamides coming from at least two salts such as hexamethylene diammonium, paraaminodicyclohexyl methane and isophorone diamine adipates, sebacates, dodecane-dioates, etc., alone or with a lactum such as caprolactam. Mention may also be made of certain yarns of homopolyamides such as those obtained from salts of paraaminodicyclohexyl methane, as well as certain epoxy resin yarns.

For the production of a ply in accordance with the invention, it is advisable to use rovings composed of numerous parallel high-performance continuous filaments, for instance of at least 1,000 and preferably at least 3,000 filaments, which number may range up to 10,000 or even more if desired.

This roving must first of all be adjusted to a weight per unit surface less than that desired for the final ply, by, for instance, at least 5%. As a matter of fact, this adjustment must be effected before the making-up of the ply if it is desired to control the final weight of the latter. The weight per unit of surface of the roving must necessarily be less than that desired for the ply in order to take into account the weight of the thermofusible yarns which will then be added. If desired, this weight per unit surface can be very much less than that desired for the ply, which makes it possible to have the successive rovings overlap to arrive at the final weight desired, which also makes it possible to use the same roving for the manufacture of plies of different weights per unit surface. Of course, the weight per unit surface of the roving must never be equal to, nor in particular greater than, that desired for the ply since in such case it would be necessary to manufacture the latter with a slack structure in order to take into account the weight of the thermofusible yarns and possibly the additional weight of the roving in order to achieve the final weight desired, which would be harmful to the good properties of the composite material resulting therefrom.

In order to effect this adjustment under good conditions and retain it until the manufacture of the ply, it is desirable to deposit an adhesive material on the roving, for instance 2 to 4% or more of an epoxy resin such as those available on the market under the trade names Epikote 812, 828 or 834 put out by Shell, or NOVALAQUE, CY 205 or Araldite put out by CIBA. It is generally preferred to use an epoxy resin obtained from glycerol, such as that available under the name Epikote 812, which does not require the use of solvent for its application, for reasons of ease in use.

In order to assure the uniform depositing of the resin, it is necessary to use a device which makes it possible to spread it over the entire width of the roving, in a uniform amount, for instance by means of a metering pump.

For the manufacture of the ply proper, several rovings of adjusted weight may be arranged side by side and parallel to each other without any space between them. If desired, the rovings may be caused to overlap in part.

Thereupon the thermofusible yarns selected are deposited as previously stated on one or both faces of the ply. These yarns are brought to a temperature sufficient to fuse them, possibly while applying pressure, for instance by means of two jaws, at least one of which is heated. The synthetic yarns upon fusing bond together all the high-performance filaments located on the surface along their deposit without, however, passing through the ply, which would have the effect of separating the said high-performance filaments.

The process of the invention can obviously be carried out continuously or intermittently.

The plies in accordance with the invention may be very light, depending upon the adjusted weight of the roving at the start, and much lighter than the plies obtained up to the present time, although they may also be heavier if desired. This lightness of the plies is of great interest in particular for the production of composite materials intended for the aeronautical industry. In particular it makes it possible to use several layers of plies, since it is known that composite materials reinforced by means of a plurality of light plies which are superimposed and crossed are much stronger than those reinforced with a single ply of a weight identical to the total weight of the light plies.

The structure of the ply is substantially close and the carbon or graphite filaments are perfectly unidirectional, which confers good properties on composite materials reinforced in this way. Furthermore, it is possible by the process of the invention to manufacture plies in which the angle of crossing of the high-performance filaments with the thermofusible yarns can be selected practically as desired; it may, for instance, be selected in such a manner that it is between $90° \pm 60°$ or more, which is particularly of interest for the manufacture of certain composite materials in which angles of 45° are sought. Furthermore, this possibility of selecting the direction of high-performance filaments as desired in the ply makes it possible to use several layers of different directions of the high-performance filaments, which makes it possible further to improve the performances of the material resulting therefrom.

The plies in accordance with the invention have very good resistance to the subsequent handlings which they may undergo.

Finally, the method of the invention makes it possible to manufacture as desired the plies of desired weight, direction of high-performance filaments and strength.

The plies in accordance with the invention find numerous applications in the manufacture of laminated composite materials, particularly those of very high performance. They are particularly valued in the aeronautical and aerospace industry for the making of parts which must have great resistance to stresses and mechanical and thermal shocks, such as helicopter blades and turbine vanes.

Figure 1:
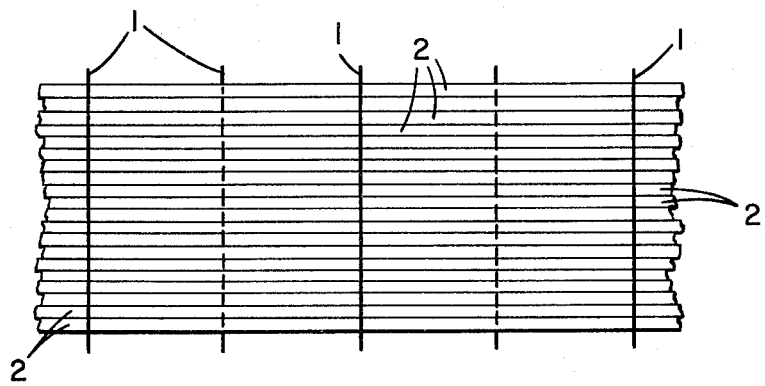
FIG. 1 shows a nonwoven ply in accordance with the invention in which the angle of crossing of the synthetic yarns 1 and the high-performance yarns 2 is 90°.
Figure 2:
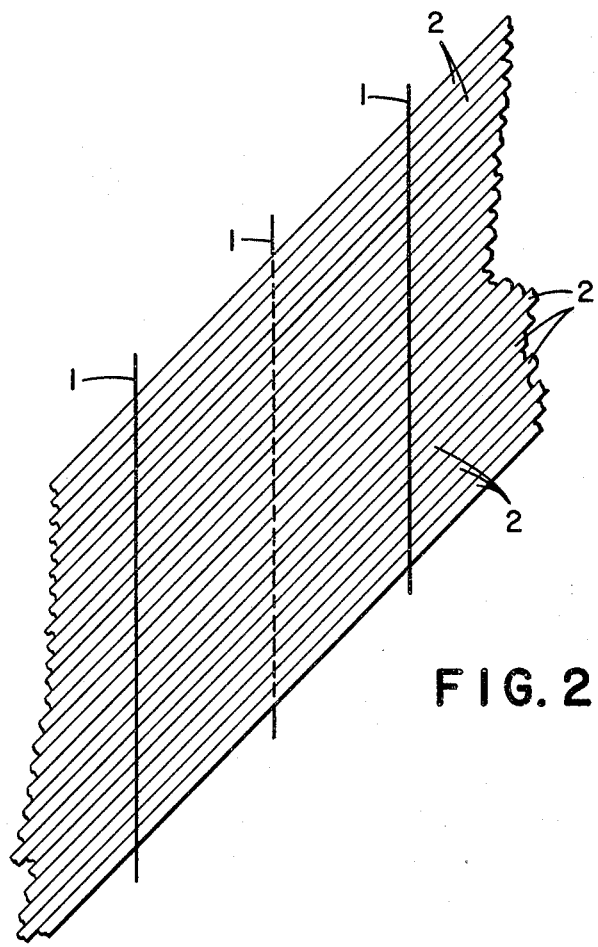
FIG. 2 shows another nonwoven ply in accordance with the invention in which this angle of crossing is 45°.

In this figure, the roving 11 comes from the spool 12, passes over a series of bars 13 in order to spread out the roving and make the filaments parallel, and then passes over two pulleys 14 which adjusts the width and therefore the weight of the spread roving. The roving then passes flush with the bevel-cut end of the tube 15 fed with gluing resin by means of a metering pump 16. Thereupon the roving passes between the rollers 17 and 18 for the calendering and distribution of the resin over the entire width of the roving which is finally wound up on the bobbin 19.

The following examples in which the percentages are by weight are given by way of illustration of the invention, without in any way limiting it.

EXAMPLE 1

Figure 3:
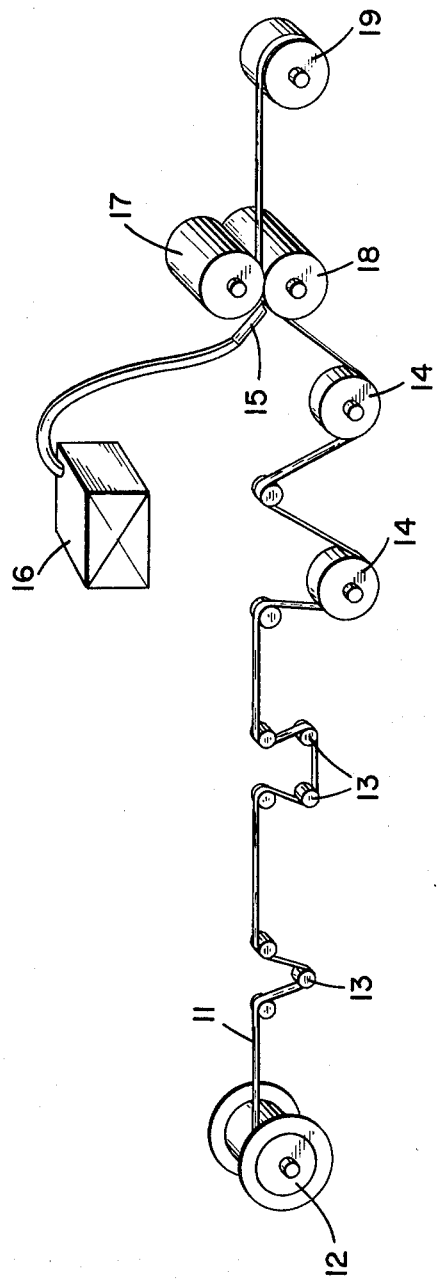
FIG. 3 shows a non-limitative embodiment of a device for adjusting the weight and gluing the roving in accordance with the invention.

On a roving formed of 4,320 graphite filaments of a modulus of elasticity in tension of 28,300 hectobars and of a linear weight of 0.64 g/m, there is deposited 3.5% of an epoxy resin of glycerol (Epikote 812 manufactured by SHELL) by passage through the device shown in FIG. 3 in which the width of the groove of the pulleys 14 is 6 mm, the rate of flow of resin of the metering pump is 0.047 g/minute, and the speed of passage of the roving is 2.50 m/minute.

180 rovings which have thus been glued are arranged side by side, whereupon yarns of 1,000 dtex formed of a copolyamide obtained from caprolactam and hexamethylene diammonium adipate and sebacate having a melting point of 130°C are deposited on each of the faces of the resultant ply at an angle of 90° with respect to the direction of the rovings and at a distance of 5 cm apart. These copolyamide yarns are so arranged that a yarn deposited on one face is located between two adjacent yarns deposited on the other face.

The ply is pressed between two jaws at 150°C, which causes the fusion of the yarns.

There is obtained a non-deformable ply of very good strength, of a weight per unit surface of 123 g/m2 approximately, of a thickness of 0.12 mm, and containing 93.6% graphite filaments.

A composite material having 60% fiber is made with this ply by impregnating it with an epoxy resin available on the market under the name Epikote 828 manufactured by SHELL. The modulus of elasticity in flexure of the resultant material is 16,200 hectobars, its rupture stress in flexure is 98 hectobars, and its shear stress 6.6 hectobars.

EXAMPLE 2

214 rovings identical to those glued in Example 1 are arranged side by side, whereupon yarns of 1,000 dtex formed of the same copolyamide as in Example 1 are deposited on each of the faces of the resultant ply at an angle of 45° with respect to the direction of the rovings, and at a distance of 4 cm apart. Here again these yarns are so arranged that a yarn deposited on one face is located between two contiguous yarns deposited on the other face.

The fusing of the synthetic yarns is brought about in the same manner as in Example 1, thus obtaining a non-deformable ply of very good strength, of a weight per unit surface of 146.6 g/m2 and a thickness of 0.14 mm, containing 93.4% graphite filaments.

A composite material with 55% fiber is made by superimposing several layers of this ply and impregnating it by means of an epoxy resin available on the market under the name of resin CY 205 manufactured by CIBA. This modulus of elasticity in flexure of the resultant material is 15,400 hectobars, its rupture stress in flexure is 80 hectobars, and its shear stress 5.85 hectobars.

EXAMPLE 3

A roving formed of 4,320 carbon filaments of a modulus of elasticity in tension of 18,400 hectobars and of a linear weight of 0.58 g/m passes through the device shown in FIG. 3 in which the width of the grooves of the pulleys 14 is 4 mm and the deposit of epoxy resin of glycerol is 4%.

282 rovings which have been thus glued and sized are arranged side by side and the same yarns as in Example 1 are deposited on each of the faces at an angle of 90° with respect to the direction of the rovings, with a distance of 4 cm between them.

After fusion of the yarns, there is obtained a non-deformable ply of very good strength, of a weight per unit surface of 175 g/m2, and a thickness of 0.17 mm, and containing 93.4% carbon.

A composite material obtained from this ply having 55% fiber in the epoxy resin has a modulus of elasticity in flexure of 10,850 hectobars and a rupture stress in flexure of 90 hectobars, as well as a shear stress of 3.8 hectobars.

EXAMPLE 4

A roving formed of 4,320 carbon filaments of a modulus of elasticity in tension of 17,800 hectobars and a linear weight of 0.61 g/m passes through the device shown in FIG. 3 in which the width of the grooves of the pulleys 14 is 8 mm and the deposit of epoxy resin of glycol 3%.

140 rovings thus glued are arranged side by side and the same yarns as in Example 1 are deposited on each of the faces at an angle of 60° with respect to the direction of the rovings, with a distance of 8 cm between them on each face.

After fusion of the yarns, there is obtained a non-deformable ply of very good strength, of a weight per unit surface of 90.4 g/m2, a thickness of 0.09 mm, and containing 94.4% carbon fiber.

Although the invention has been described in detail for the purpose of illustration, it is understood that such detail is solely for that purpose and that variations can be made by those skilled in the art without departing from the spirit and scope of the invention except as it may be limited by the claims.

What I claim is;

1. A ply of parallel continuous carbon filaments arranged one against the other substantially free from any space between them along their whole length, having a weight per unit of surface of not more than 450 grams per square meter and a thickness of not more than 1 millimeter, said filaments being bound together by fused synthetic yarns disposed transversely with respect to the direction of the filaments on at least one face of the ply without passing through the ply from one face to the other, said ply containing at least 85% fibers having a modulus of elasticity in tension of at least 12000 hectobars.

2. The product of claim 1 having a weight per unit of surface of less than 150 grams per square meter and a thickness of less than 0.14 millimeters.

3. The product of claim 1 wherein the fused yarns extend across the said filaments at an angle of 30° to 150° with the longitudinal axis of the filaments.

4. The product of claim 1 wherein the fused synthetic yarns are (a) copolyamide yarns obtained from at least two salts selected from adipates, sebacates, dodecanedioates of hexamethylene diammonium, paraaminodicyclohexyl methane and isophorone diamine or (b) copolyamide yarns obtained from a lactam and at least two of the salts recited in (a) or (c) the homopolyamide yarns obtained from salts of paraaminodicyclohexyl methyl or (d) epoxy resin yarns.

5. The product of claim 1 wherein the filaments are graphite.

6. A web of substantially parallel contiguously disposed elongated carbon filaments, said web having a weight of not more than 450 grams per square meter and a thickness of not more than 1 millimeter, a plurality of longitudinally spaced synthetic resinous yarns disposed transversely across a surface of the filaments and fused to the surface of the filaments without substantial penetration therebetween to bind the filaments together, at least 85% of the filaments having a modulus of elasticity in tension of at least 12000 hectobars.

7. The web of claim 6 wherein the carbon filaments are graphite.

8. A ply of parallel continuous rovings of carbon filaments, at least 85% by weight of said filaments having a modulus of elasticity in tension of at least 12000 hectobars, said ply having a weight of not more than 450 grams per square meter of surface and a thickness of not more than 1 millimeter, and a plurality of longitudinally spaced yarns extending transversely across a surface of the ply and fused thereto to hold the rovings in contiguous side by side parallel relationship without passing through the ply from one surface to another.

9. The ply of claim 8 wherein the carbon filaments are graphite.

10. A method of making a ply of parallel continuous high-performance carbon filaments having a closed structure, a weight per unit surface of not more than 450 grams per square meter and a thickness of not more than 1 millimeter comprising coating the surface of a roving of a plurality of continuous filaments with an adhesive, adjusting the roving to a weight slightly less than the desired weight of the ply while maintaining the filaments in parallel and adjoining relationship, disposing thermofusible yarns transversely across the filaments and fusing the yarns until the filaments are bound together without penetration of the resulting ply by the fused yarns.

11. The method of claim 10 wherein the weight of the roving is 5% less than that desired for the ply.

* * * * *